(12) United States Patent
Kowalewski

(10) Patent No.: US 11,539,760 B2
(45) Date of Patent: *Dec. 27, 2022

(54) COMMUNICATION DEVICES AND METHODS FOR OPERATING A COMMUNICATION DEVICE

(71) Applicant: Apple Inc., Cupertino, CA (US)

(72) Inventor: Frank Kowalewski, Goettingen (DE)

(73) Assignee: Apple Inc., Cupertino, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/327,646

(22) Filed: May 21, 2021

(65) Prior Publication Data

US 2021/0281615 A1 Sep. 9, 2021

Related U.S. Application Data

(63) Continuation of application No. 15/919,051, filed on Mar. 12, 2018, now Pat. No. 11,019,112, which is a continuation of application No. 13/803,023, filed on Mar. 14, 2013, now Pat. No. 9,954,904.

(60) Provisional application No. 61/657,063, filed on Jun. 8, 2012.

(51) Int. Cl.
*H04L 65/1069* (2022.01)
*H04L 69/24* (2022.01)
*H04W 4/50* (2018.01)

(52) U.S. Cl.
CPC .......... *H04L 65/1069* (2013.01); *H04L 69/24* (2013.01); *H04W 4/50* (2018.02)

(58) Field of Classification Search
None
See application file for complete search history.

(56) References Cited

U.S. PATENT DOCUMENTS

| 9,954,904 | B2 | 4/2018 | Kowaleski |
| 11,019,112 | B2 | 5/2021 | Kowaleski |
| 2004/0152457 | A1 | 8/2004 | Goldstein et al. |
| 2005/0114485 | A1 | 5/2005 | McCollum |
| 2005/0281233 | A1 | 12/2005 | Parker |

(Continued)

FOREIGN PATENT DOCUMENTS

| CN | 1878151 | 12/2006 |
| CN | 101326846 | 12/2008 |

(Continued)

OTHER PUBLICATIONS

[No Author Listed], "AT Command Set and Register Summary for Silicon Labs Si2493 Modems on Cisco 1800 Series Integrated Service Routers," Jan. 31, 2007, retrieved from URL <https://www.cisco.com/c/en/us/td/docs/routers/access/modem/AT/Cormand/reference/atslabs.htra>, 58 pages.

(Continued)

*Primary Examiner* — Scott B Christensen
(74) *Attorney, Agent, or Firm* — Fish & Richardson P.C.

(57) ABSTRACT

A communication device may include a message generator configured to generate a message in accordance with a command set to use a communication service provided by a communication session setup protocol; and a modem circuit coupled to the message generator and configured to operate in accordance with the message generated by the message generator; wherein the message generator is configured to generate the message comprising a command to at least one of control or establish an Internet Protocol Multimedia Subsystem service.

16 Claims, 4 Drawing Sheets

(56) References Cited

U.S. PATENT DOCUMENTS

| | | |
|---|---|---|
| 2007/0043730 A1 | 2/2007 | Wisely |
| 2008/0152126 A1 | 6/2008 | Pitkamaki et al. |
| 2009/0132632 A1 | 5/2009 | Jackson et al. |
| 2009/0186668 A1 | 7/2009 | Rahman et al. |
| 2009/0210478 A1 | 8/2009 | Bakker et al. |
| 2009/0280794 A1 | 11/2009 | Desruelle et al. |
| 2010/0061316 A1 | 3/2010 | Levenshteyn et al. |
| 2010/0220604 A1 | 9/2010 | Skog et al. |
| 2011/0069635 A1 | 3/2011 | Low et al. |
| 2011/0235614 A1 | 9/2011 | Lerzer et al. |
| 2012/0072601 A1 | 3/2012 | Bharadwaj |
| 2012/0082095 A1 | 4/2012 | Sun et al. |
| 2012/0096111 A1 | 4/2012 | Jellinek |
| 2013/0332615 A1 | 12/2013 | Kowaleski |
| 2018/0205768 A1 | 7/2018 | Kowaleski |
| 2021/0281615 A1 | 9/2021 | Kowaleski |

FOREIGN PATENT DOCUMENTS

| | | |
|---|---|---|
| CN | 101340671 | 1/2009 |
| CN | 101480013 | 7/2009 |
| CN | 101854184 | 10/2010 |
| CN | 102387124 | 3/2012 |
| WO | WO 2012044085 | 4/2012 |

OTHER PUBLICATIONS

3GPP, "AT Commands for URI Dialing," 3GPP CT1 Change Request CT1-122485, Kyoto, Japan, May 21-25, 2013, 9 pages.

3GPP, "Digital Cellular Telecommunication System (Phase 2+); Universal Mobile Telecommunications System (UMTS); LTE; AT Command Set for User Equipment (UE)," ETSI TS 127 007 V10.4.0 (Jun. 2011); 3GPP TS 27.007 V10.4.0 (Release 10), Section 6.16, p. 39; Section 7.1; p. 49; 2 pages.

3GPP, "Technical Specification Group Core Network and Terminals; AT Command Set for User Equipment (UE) (Release 11)," 3GPP TS 27.007 V11.3.0 (Jun. 2012), 271 pages.

3GPP, "Technical Specification Group Core Network and Terminals; IP Multimedia Call Control Protocol Based on Session Initiation Protocol (SIP) and Session Description Protocol (SIP); Stage 3 (Release 10)," 3GPP TS 24.299 V10.6.1 (Jan. 2012).

3GPP, "Technical Specification Group Core Network and Terminals; AT Command Set for User Equipment (UE) (Release 10)," 3GPP TS 27.007 V10.3.0 (Mar. 2011), 258 pages.

3GPP, "Technical Specification Group Core Network and Terminals; AT command set for User Equipment (UE) (Release 11)," 3GPP TS 27.007 V11.1.0 (Dec. 2011), 266 pages.

3GPP, "Technical Specification Group Core Network and Terminals; AT Command Set for User Equipment (UE) (Release 7)," 3GPP TS 27.007 V7.2.0 (Sep. 2006), 177 pages.

3GPP, Technical Specification Group Core Network and Terminals; IP Multimedia Call Control Protocol Based on Session Initiation Protocol (SIP) and Session Description Protocol (SDP); Stage 3 (Release 11); 3GPP TS 24.299 V11.3.0 (Mar. 2012), 728 pages.

3GPP, "Technical Specification Group Services and System Aspects; IP Multimedia Subsystem (IMS); Stage 2 (Release 11)," 3GPP TS 23.288 V11.4.0 (Mar. 2012), 287 pages.

ETSI TS 100 916 V7.4.0 (Nov. 1999).

Nokia, "Modum Emulator—Call Control," Qtopia 4.3.3, 2008, URL<https://doc.qt.io/archives/qtopia4.3/modememulator-callcontrol.html> [Jan. 3, 2017 2:31:09 PM].

Rosenberg et al., "IETF Request for Comments RFC3261, SIP: Session Initiation Protocol," Jun. 2002, 270 pages.

Telit Wireless Solutions, "AT Commands Reference Guide," 80000ST 10025a Rev. 10, Feb. 17, 2011.

The Network Encyclopedia, "Modulation," URL<http://www.thenetworkencyclopedia.com/entr/modulation/> as retrieved on Aug. 1, 2017.

Wikipedia, "Qt Extended," URL<https://en.wikipedia.org/wiki/Qt_Extended> [Jan. 3, 2017 2:29:47 PM].

[No Author Listed], "Digital cellular telecommunications system (Phase 2+);Universal Mobile Telecommunications System (UMTS); General Packet Radio Service (GPRS); Service description; Stage 2 (3GPP TS 23.606 version 10.3.0 Release 10)," ETSI TS 123.060 V10.3.0, Mar. 2011, 322 pages.

[No Author Listed], "Digital cellular telecommunications system (Phase 2+);Universal Mobile Telecommunications System (UMTS); LTE; Mobile radio interface Layer 3 specification; Core network protocols; Stage 3 (3GPP TS 24.008 version 9.6.0 Release 9)," ETSI TS 124.008 V9.6.0, Mar. 2011, 615 pages.

[No Author Listed], "Digital cellular telecommunications system (Phase 2+);Universal Mobile Telecommunications System (UMTS); General Packet Radio Service (GPRS); Service description; Stage 2 (3GPP TS 23.060 version 10.3.0 Release 10)," ETSI TS 123.060 V10.3.0, Mar. 2011, 322 pages.

3GPP, Technical Specification Group Core Network and Terminals; IP Multimedia Call Control Protocol Based on Session Initiation Protocol (SIP) and Session Description Protocol (SDP); Stage 3 (Release 11); 3GPP TS 24.229 V11.3.0 (Mar. 2012), 728 pages.

3GPP, "Technical Specification Group Core Network and Terminals; IP Multimedia Call Control Protocol Based on Session Initiation Protocol (SIP) and Session Description Protocol (SIP); Stage 3 (Release 10)," 3GPP TS 24.229 V10.6.1 (Jan. 2012).

3GPP, "Technical Specification Group Services and System Aspects; IP Multimedia Subsystem (IMS); Stage 2 (Release 11)," 3GPP TS 23.228 V11.4.0 (Mar. 2012), 287 pages.

COMMUNICATION DEVICES AND METHODS FOR OPERATING A COMMUNICATION DEVICE

CROSS-REFERENCE TO RELATED APPLICATION

This present application is a continuation of U.S. patent application Ser. No. 15/919,051, filed Mar. 12, 2018, which is a continuation of U.S. application Ser. No. 13/803,023, filed Mar. 14, 2013, entitled "COMMUNICATION DEVICES AND METHODS FOR OPERATING A COMMUNICATION DEVICE," which claims priority to U.S. Application No. 61/657,063, which was filed Jun. 8, 2012, entitled "COMMUNICATION DEVICES AND METHODS FOR OPERATING A COMMUNICATION DEVICE," the entire disclosures of which are hereby incorporated by reference in their entireties for all purposes, except for those sections, if any, that are inconsistent with this specification.

TECHNICAL FIELD

Various aspects of the disclosure relate generally to communication devices and to methods for operating a communication device.

BACKGROUND

The so called Internet Protocol (IP) Multimedia Subsystem (IMS) provides communication services via the Internet Protocol and IMS communication service calls are usually controlled via the Session Initiation Protocol (SIP). Some IMS communication services can be identified by means of so called IMS Communication Service Identifiers (ICSIs). Moreover, so called mobile terminations (which illustratively include modem hardware including one or more transmitters and one or more receivers for inter device communications, also referred to as MT) can be controlled by a so called terminal equipment (which illustratively includes hardware configured to interact with an end user and which includes one or more application processors and means for user interaction, also referred to as TE) through so called AT commands. AT commands exist for controlling voice calls, supplementary communication services and short messaging services as non-IMS services. However, conventionally, an AT command can control only a single voice call. Currently new AT commands are being defined by the 3rd Generation Partnership Project (3GPP) standardization group for dialing Uniform Resource Identifiers (URIs) to be used by IMS services.

SUMMARY

A communication device may include a message generator configured to generate a message in accordance with a command set to use a communication service provided by a communication session setup protocol; and a modem circuit coupled to the message generator and configured to operate in accordance with the message generated by the message generator; wherein the message generator is configured to generate the message comprising a command to at least one of control or establish an Internet Protocol Multimedia Subsystem service.

BRIEF DESCRIPTION OF THE DRAWINGS

In the drawings, like reference characters generally refer to the same parts throughout the different views. The drawings are not necessarily to scale, emphasis instead generally being placed upon illustrating the principles of the invention. In the following description, various embodiments of the invention are described with reference to the following drawings, in which.

DESCRIPTION

Figure 1:
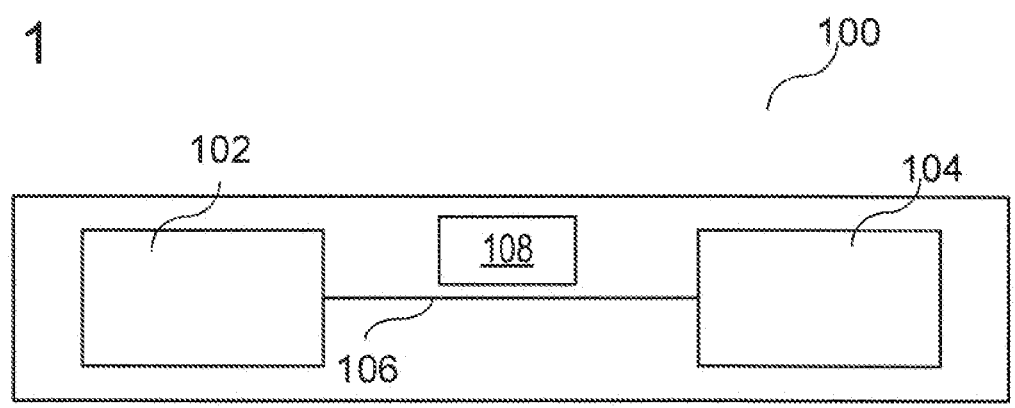
FIG. 1 shows a communication device in accordance with various aspects of this disclosure.

The following detailed description refers to the accompanying drawings that show, by way of illustration, specific details and embodiments in which the invention may be practiced.

The word "exemplary" is used herein to mean "serving as an example, instance, or illustration". Any embodiment or design described herein as "exemplary" is not necessarily to be construed as preferred or advantageous over other embodiments or designs.

The word "over" used with regards to a deposited material formed "over" a side or surface, may be used herein to mean that the deposited material may be formed "directly on", e.g. in direct contact with, the implied side or surface. The word "over" used with regards to a deposited material formed "over" a side or surface, may be used herein to mean that the deposited material may be formed "indirectly on" the implied side or surface with one or more additional layers being arranged between the implied side or surface and the deposited material.

In various aspects of this disclosure, a "circuit" may be understood as any kind of a logic implementing entity, which may be special purpose circuitry or a processor executing software stored in a memory, firmware, or any combination thereof. Thus, in various aspects of this disclosure, a "circuit" may be a hard-wired logic circuit or a programmable logic circuit such as a programmable processor, for example a microprocessor (for example a Complex Instruction Set Computer (CISC) processor or a Reduced Instruction Set Computer (RISC) processor). A "circuit" may also be a processor executing software, for example any kind of computer program, for example a computer program using a virtual machine code such as for example Java. Any other kind of implementation of the respective functions which will be described in more detail below may also be understood as a "circuit" in accordance with an alternative aspect of this disclosure.

Various aspects of this disclosure are provided for devices, and various aspects of this disclosure are provided for methods. It will be understood that basic properties of the devices also hold for the methods and vice versa. Therefore, for sake of brevity, duplicate description of such properties may be omitted.

It will be understood that any property described herein for a specific device may also hold for any device described herein. It will be understood that any property described herein for a specific method may also hold for any method described herein.

The term "protocol" is intended to include any piece of software, that is provided to implement part of any layer of the communication definition.

A memory used in various aspects of this disclosure may be a volatile memory, for example a DRAM (Dynamic Random Access Memory) or a non-volatile memory, for example a PROM (Programmable Read Only Memory), an EPROM (Erasable PROM), EEPROM (Electrically Erasable PROM), or a flash memory, for example, a floating gate memory, a charge trapping memory, an MRAM (Magnetoresistive Random Access Memory) or a PCRAM (Phase Change Random Access Memory).

It has been found out that the conventional AT commands suffer from several disadvantages, such as:
  Existing AT commands cannot specify the type of IMS service to be controlled.
  Existing AT commands cannot specify media to be used by IMS services.
  Existing AT commands cannot specify media quality for IMS services.
  Existing AT commands cannot specify whether media data encoding and media data decoding is to be done by MTs or by TEs.
  Existing AT commands cannot be used to find out which IMS services are supported by MTs.
  Existing AT commands cannot be used to configure media support for incoming calls.
  Existing AT commands cannot be used to modify ongoing communication sessions or communication calls.
  Existing AT commands cannot be used to control multiple instances of a particular communication service.
  Existing AT commands cannot be used to control the media data of an incoming call.

Various aspects of this disclosure introduce commands, e.g. AT commands, for controlling IMS services that are provided by a mobile termination, whereby the commands allow to specify whether media data are to be encoded and decoded inside or outside the mobile termination and whereby instances of an IMS service can be identified.

As will be described in more detail below, various aspects of this disclosure may provide one or more of the following effects:
  The type of IMS service can be controlled.
  Media to be used by IMS services can be specified.
  Media quality for IMS services can be specified.
  It can be specified whether media data encoding and decoding is to be done by one or more MTs or by one or more TEs.
  It can be determined which IMS services are supported by MTs.
  Media support for incoming calls can be configured.
  Ongoing communications can be modified.
  Multiple instances of a particular service can be controlled.
  Media of an incoming call can be controlled.
  The syntax of utilized commands is linear and simple and therefore easy to parse.

In this disclosure, a mobile termination may be understood as including modem hardware including one or more transmitters and one or more receivers for inter device communications and may be referred to as MT. The MT may be controlled by a so called terminal equipment, which may include hardware configured to interact with an end user and which may include one or more application processors and means for user interaction through so called AT commands. The terminal equipment may also be referred to as TE.

FIG. 1 shows a communication device 100 in accordance with various aspects of this disclosure. As shown in FIG. 1, the communication device 100 may include a message generator 102 configured to generate a message 108 in accordance with a command set for using a communication service provided by a communication session setup protocol, e.g. by the Session Initiation Protocol (SIP). Furthermore, the communication device 100 may include a modem circuit 104 coupled to the message generator 102, wherein the modem circuit may be configured to operate in accordance with the message 108 generated by the message generator 102. The modem circuit 104 may be coupled with the message generator 102 by means of one or more connections 106, such as one or more wireline connections and/or one or more wireless connections. By way of example, the one or more connections may include one or more connection lines such as one or more bus lines. The message generator 102 may be configured to generate the message 108 including a command to at least one of control or establish an Internet Protocol Multimedia Subsystem (IMS) service. IMS may be understood as a standardized Next Generation Networking (NGN) architecture for telecom operators that want to provide mobile and fixed Internet Protocol (IP) based multimedia services. By way of example, it may use a Voice-over-IP (VoIP) implementation based on a 3GPP standardized implementation of SIP, and runs over the standard Internet Protocol (IP). Existing phone systems (both packet-switched and circuit-switched) are supported. The IMS is not only providing new services, but all the services, current and future, that the Internet provides. IMS uses open standard IP protocols, defined by the IETF (Internet Engineering Task Force). Thus, a multimedia session between two IMS users, between an IMS user and a user on the Internet, and between two users on the Internet may be established using exactly the same protocol. Moreover, the interfaces for service developers may also be based on IP protocols. Thus, illustratively, the message 108 may be exchanged between the message generator 102 and the modem circuit 104 to control the modem circuit 104.

The communication device 100 may be a mobile radio communication device or a wireline communication device. Furthermore, the communication device 100 may be included in any electronic device which has the capability of communicating with the Internet to use IMS, such as e.g. a personal computer, a laptop, a workstation, a netbook computer, a smartphone, etc.

The message generator 102 may be configured to generate the message comprising an identifier to identify the Internet Protocol Multimedia Subsystem service or to identify an instance of the Internet Protocol Multimedia Subsystem service. Furthermore, the communication device may further include an application processor, wherein the message generator is configured to generate the message comprising information specifying whether media data is at least one of encoded or decoded by the application processor of the communication device. The communication device 100 may further include a terminal equipment including the application processor. The message generator 102 may be configured to generate the message including at least one of the following: information specifying a Uniform Resource Identifier; information specifying a modification of an established communication connection; information specifying a configuration of a communication service; or information controlling an incoming call. The message generator 102 may be configured to generate the message comprising information specifying a Uniform Resource Identifier and at least one of a communication service parameter or a communication call identifier. The communication service parameter may include an Internet Protocol Multimedia Subsystem Communication Service Identifier (ICSI). Furthermore, the message generator 102 may be configured to generate the message including a communication service parameter and a media data parameter to specify media data and media data properties for the Internet Protocol Multimedia Subsystem service. The media data parameter may include Session Description Protocol data. Moreover, the message generator is configured to generate the message in accordance with a modem command set. The message generator may be configured to generate the message in accordance with the AT command set. The communication session setup protocol may provide a communication service. The communication session setup protocol may be e.g. the Session Initiation Protocol. The modem circuit may further include one or more transmitter circuits and/or one or more receiver circuits. The modem circuit may be configured as a mobile termination.

In various aspects of this disclosure, a communication device may be provided. The communication device may include a message generator configured to generate a message in accordance with a command set provided for a communication within the communication device and to control a communication service provided for a communication with another communication device; and a modem circuit coupled to the message generator and configured to operate in accordance with the message generated by the message generator; wherein the message generator is configured to generate the message comprising a command to at least one of control or establish an Internet Protocol based communication service.

The message generator may be configured to generate the message including a command to control and/or establish an Internet Protocol based multimedia communication service. The message generator may be configured to generate the message including an identifier to identify the Internet Protocol based communication service or to identify an instance of the Internet Protocol based communication service. The communication device may further include an application processor, wherein the message generator may be configured to generate the message including information specifying whether media data is encoded and/or decoded by the application processor. The application processor may be located in a terminal equipment. The message generator may be configured to generate the message including at least one of the following: information specifying a Uniform Resource Identifier; information specifying a modification of an established communication connection; information specifying a configuration of a communication service; or information controlling an incoming call. The message generator may be configured to generate the message including information specifying a Uniform Resource Identifier and at least one of a communication service parameter or a communication call identifier. The communication service parameter may include an Internet Protocol Multimedia Subsystem Communication Service Identifier (ICSI). Furthermore, the message generator may be configured to generate the message including a communication service parameter and a media data parameter to specify media data and media data properties for the Internet Protocol based communication service. The media data parameter may include Session Description Protocol data. The message generator may further be configured to generate the message in accordance with a modem command set. The message generator may further be configured to generate the message in accordance with the AT command set. The communication session setup protocol may provide the communication service. The communication session setup protocol may be e.g. the Session Initiation Protocol. The modem circuit may further include at least one transmitter circuit and/or at least one receiver circuit. The modem circuit may be configured as a mobile termination.

Figure 2:
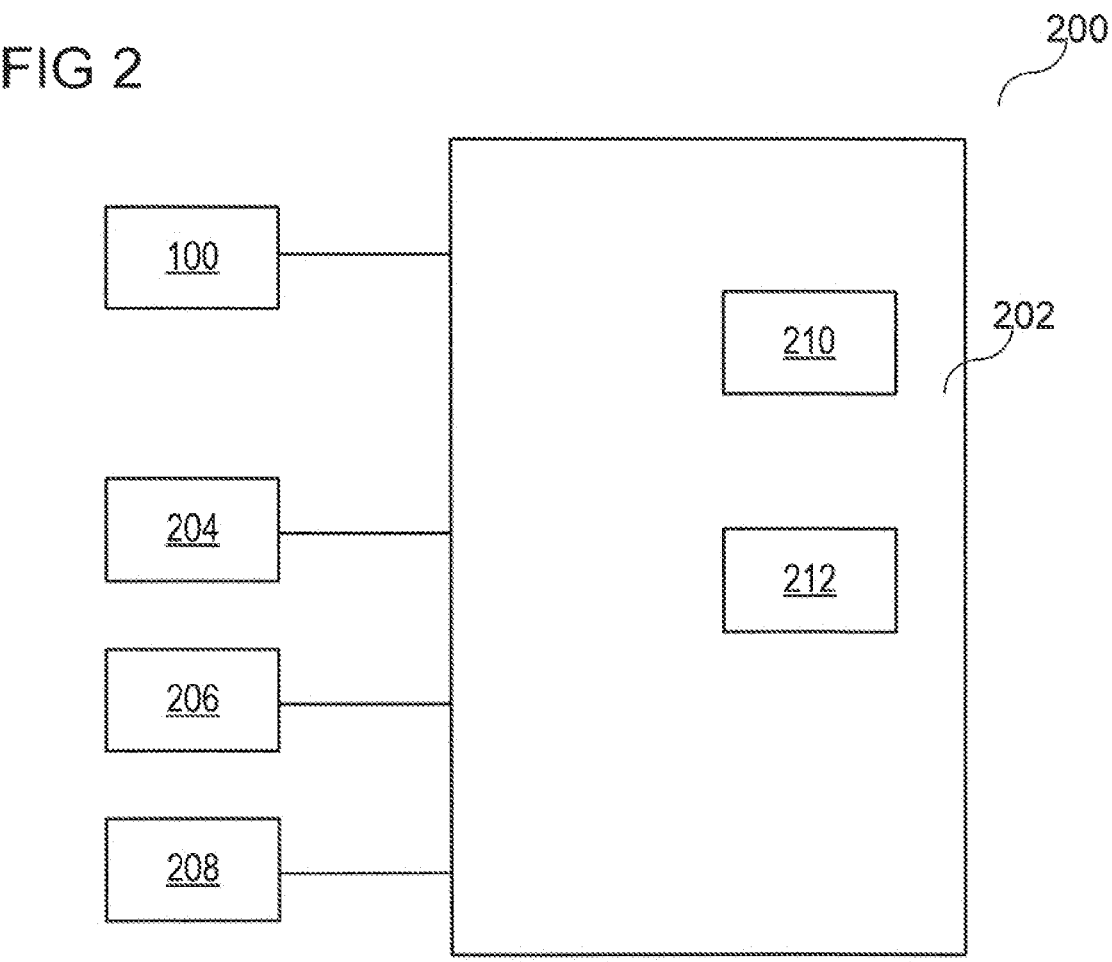
FIG. 2 shows a communication network in accordance with various aspects of this disclosure.

FIG. 2 shows a communication network 200 in accordance with various aspects of this disclosure, which may include the communication device 100, the IMS 202, and one or more other communication devices 204, 206, 208. All the communication devices 100, 204, 206, 208 may be coupled to the IMS 202 to provide or use IMS services by means of one or more wireline connections and/or one or more wireless connections (e.g. via correspondingly provided base station(s) and communication components such as Call Session Control Functions (CSFC) (e.g. Proxy Call Session Control Functions (P-CSFC) and/or Serving Call Session Control Functions (S-CSFC) and/or Interrogating Call Session Control Functions (I-CSFC)). Furthermore, one or more media data servers 210 and/or one or more application servers 212 may be provided in the IMS 202. For a communication between the communication devices 100, 204, 206, 208 with the IMS 202 or via the IMS 202, the so called Session Initiation Protocol (SIP) may be used.

Exemplary communication service may include:
Multimedia communication, e.g. voice and/or video calls;
Internet games;
Distributed file sharing and shared processing of documents, etc.

As will be described in more detail below, various aspects of this disclosure define commands for a mobile termination for dialing Uniform Resource Identifiers (URIs), modifying ongoing communication calls, configuring communication services and controlling incoming communication calls, whereby the commands allow to specify whether media data are to be encoded and decoded inside or outside e.g. the application processor, e.g. inside or outside the terminal equipment (e.g. TE) and whereby instances of an IMS service can be identified. Commands for dialing URIs may include one or more service parameters and one or more call-id parameters if a URI parameter is included. This may allow to specify IMS services to be set up.

Service parameters may include IMS Communication Service Identifier values (ICSI values) or other service indicators. ICSI values indicate the usage of services for which ICSI values exist. Furthermore, commands for dialing URIs may include one or more media data parameters if a service parameter is included. This may allow to specify media data and their properties to be used by IMS services to be set up. Media data parameters may include Session Description Protocol (SDP) media level sections or other media indicators and media qualities. SDP media level sections may indicate that the media data are to be encoded and decoded outside the MT, for example.

Commands for dialing URIs may include a particular action value to indicate that an ongoing communication service is to be modified.

Default media data properties may be specified for particular services by a special command.

Call-ids of set up communication calls may be indicated by command responses.

Media data and the call-id of an incoming communication call may also be indicated by a special command.

Figure 3:
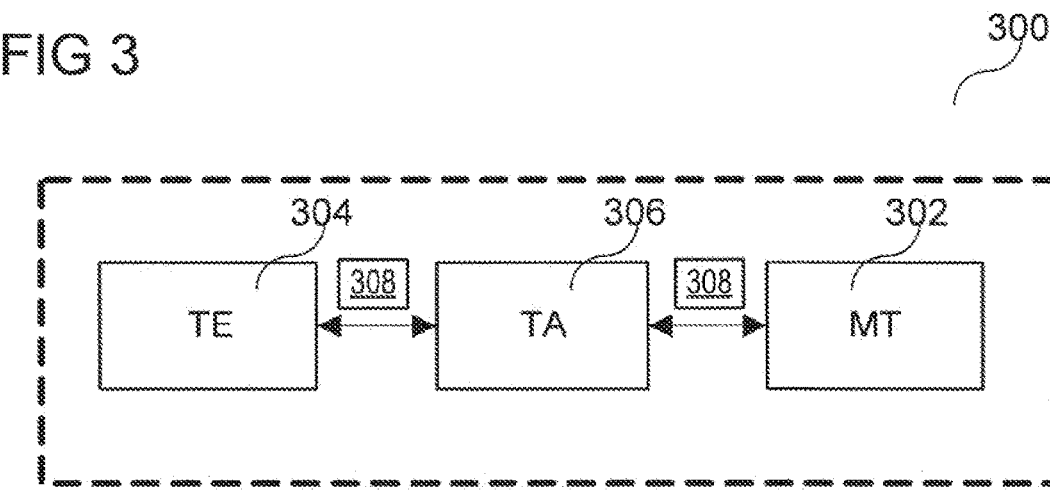
FIG. 3 shows an implementation of the communication device of FIG. 1 in accordance with various aspects of this disclosure.

FIG. 3 shows an implementation 300 of the communication device 100 of FIG. 1 in accordance with various aspects of this disclosure. As shown in FIG. 3, the communication device 300 may be a mobile radio communication device such as a mobile phone and may be configured to communicate in accordance with one or more Cellular Wide Area radio communication technologies (which may include e.g. a Global System for Mobile Communications (GSM) radio communication technology, a General Packet Radio Service (GPRS) radio communication technology, an Enhanced Data Rates for GSM Evolution (EDGE) radio communication technology, and/or a Third Generation Partnership Project (3GPP) radio communication technology (e.g. UMTS (Universal Mobile Telecommunications System), FOMA (Freedom of Multimedia Access), 3GPP LTE (Long Term Evolution), 3GPP LTE Advance (Long Term Evolution Advance)), CDMA2000 (Code division multiple access 2000), CDPD (Cellular Digital Packet Data), Mobitex, 3G (Third Generation), CSD (Circuit Switched Data), HSCSD (High-Speed Circuit-Switched Data), UMTS (3G) (Universal Mobile Telecommunications System (Third Generation)), W-CDMA (UMTS) (Wideband Code Division Multiple Access (Universal Mobile Telecommunications System)), HSPA (High Speed Packet Access), HSDP A (High-Speed Downlink Packet Access), HSUP A (High-Speed Uplink Packet Access), HSPA+(High Speed Packet Access Plus), UMTS-TDD (Universal Mobile Telecommunications System—Time-Division Duplex), TD-CDMA (Time Division—Code Division Multiple Access), TD-CDMA (Time Division—Synchronous Code Division Multiple Access), 3GPP Rel. 8 (Pre-4G) (3rd Generation Partnership Project Release 8 (Pre-4th Generation)), UTRA (UMTS Terrestrial Radio Access), E-UTRA (Evolved UMTS Terrestrial Radio Access), LTE Advanced (4G) (Long Term Evolution Advanced (4th Generation)), cdmaOne (2G), CDMA2000 (3G) (Code division multiple access 2000 (Third generation)), EV-DO (Evolution-Data Optimized or Evolution-Data Only), AMPS (IG) (Advanced Mobile Phone System (1st Generation)), TACS/ETACS (Total Access Communication System/Extended Total Access Communication System), D-AMPS (2G) (Digital AMPS (2nd Generation)), PTT (Push-to-talk), MTS (Mobile Telephone System), WITS (Improved Mobile Telephone System), AMTS (Advanced Mobile Telephone System), OLT (Norwegian for Offentlig Landmobil Telefoni, Public Land Mobile Telephony), MTD (Swedish abbreviation for Mobiltelefonisystem D, or Mobile telephony system D), Autotel/PALM (Public Automated Land Mobile), ARP (Finnish for Autoradiopuhelin, "car radio phone"), NMT (Nordic Mobile Telephony), Hicap (High capacity version of NTT (Nippon Telegraph and Telephone)), CDPD (Cellular Digital Packet Data), Mobitex, DataTAC, iDEN (Integrated Digital Enhanced Network), PDC (Personal Digital Cellular), CSD (Circuit Switched Data), PHS (Personal Handyphone System), WiDEN (Wideband Integrated Digital Enhanced Network), iBurst, Unlicensed Mobile Access (UMA, also referred to as 3GPP Generic Access Network, or GAN standard)).

A first user U1 is using his mobile phone T1 (terminal) 300 as one implementation of the communication device 100. The mobile phone 300 may include a mobile termination part MT1 302 and a terminal equipment part TE1 304. The mobile termination part MT1 302 may be configured to provide modem functionality and the terminal equipment part TE1 304 may be configured to provide application and user interface functionality. The mobile termination part MT1 302 and the terminal equipment part TE1 304 communicate via a terminal adapter TA1 306 through AT commands 308, for example.

Figure 4:
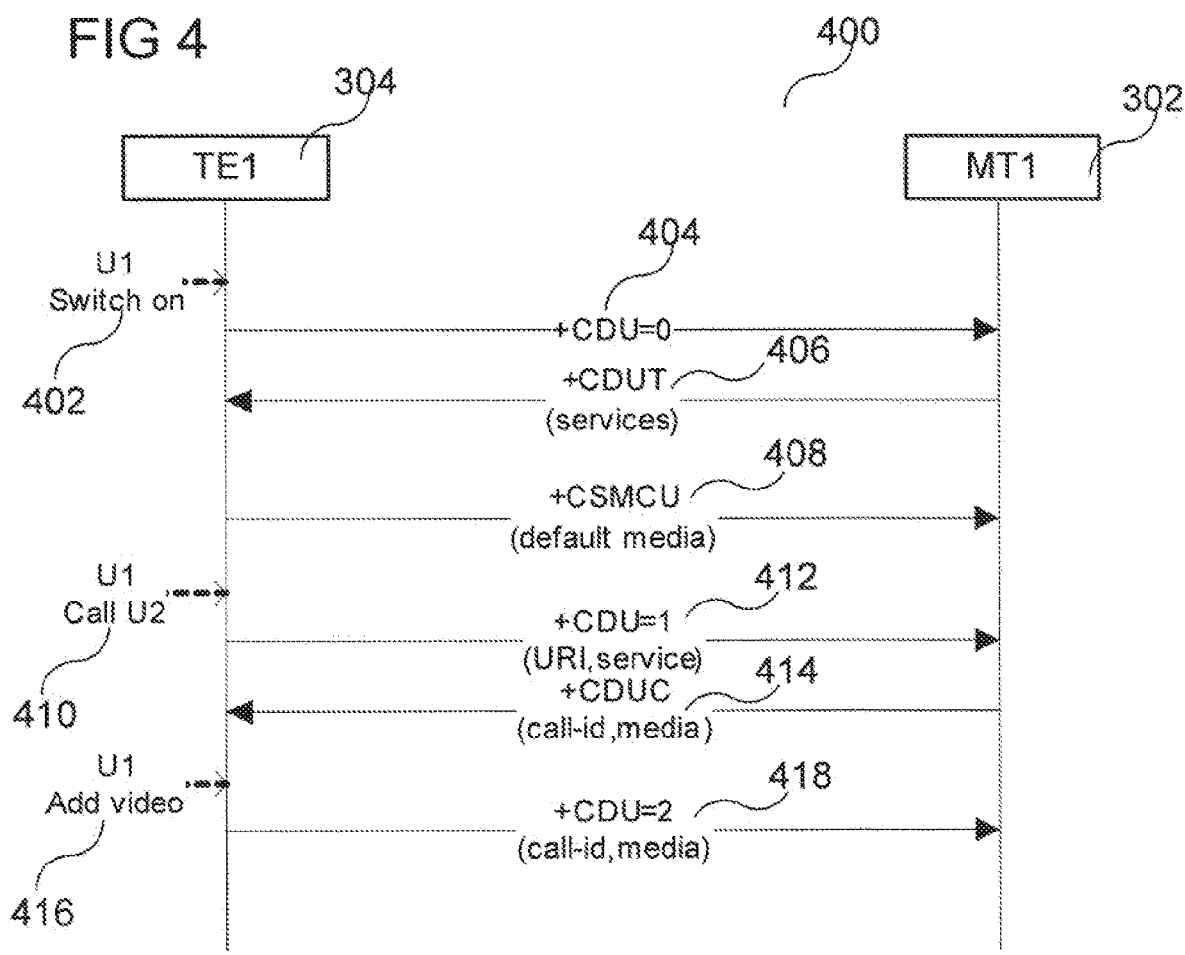
FIG. 4 shows a message flow diagram in accordance with various aspects of this disclosure.

FIG. 4 shows a message flow diagram 400 in accordance with various aspects of this disclosure. The message flow diagram 400 illustrates an MMTel communication call setup and modification. In this example, it is assumed that the first user U1 switches on his mobile phone T1 300 (block 402). During the phone's initialization process the terminal equipment part TE1 304 may generate and send the following first AT command 404 to the mobile termination part MT1 302:
+CDU=0.

The first AT command 404 requests information about supported URI schemes from the mobile termination part MT1 302.

The mobile termination part MT1 302 may generate a further message and may respond the following result 406:
+CDUT:"sip", "3gpp-service.ims.icsi.mmtel".

The result 406 informs the terminal equipment part TE1 304 that the mobile termination supports SIP URIs and that the MMTel communication service is supported for SIP URI usage.

Furthermore, it is assumed that the first user U1 has defined in mobile phone T1's 300 settings that MMTel calls should use only voice communications by default. Therefore, the terminal equipment part TE1 304 may generate and send another, e.g. a second AT command 408 to the mobile termination part MT1 302:
+CSMCU="3gpp-service.ims.icsi.mmtel","voice,high-quality".

This second AT command 408 may instruct the mobile termination part MT1 302 to set the default media for the MMTel service to high quality voice media. It may also indicate that the voice media encoding and decoding should be done by the mobile termination part MT1 302 itself.

After the mobile phone T1 300 has been initialized, it is assumed that the first user U1 requests to call his friend, a second user U2, via MMTel (block 410 in FIG. 4). The terminal equipment part TE1 304 may thus generate and send the following third AT command 412 to the mobile termination part MT1 302:
+CDU=1,"sip:bob@biloxy.com","3gpp-service.ims.icsi.mmtel",0.

After having received the third AT command 412, the mobile termination part MT1 302 may then initiate an MMTel session with the second user U2's mobile phone T2 (not shown) by generating and sending e.g. a SIP INVITE request message to the second user U2's SIP address that has been provided with the third AT command 412. The SIP INVITE request message may include SDP for high quality voice media that the mobile termination part MT1 302 is capable of encoding and decoding.

After the communication call to the second user U2's communication device (e.g. mobile phone) has been set up, the mobile termination part MT1 302 may generate a response 414 to respond the following result to the terminal equipment part TE1 304:
+CDUC:"sip:bob@biloxy.com", "3gpp-service.ims.icsi.mmtel", 1234, "voice,high-quality".

The response 414 informs the terminal equipment part TE1 304 that the communication call is being identified by "1234" and high quality voice media has been set up with encoding and decoding provided by the mobile termination part MT1 302.

Furthermore, it is assumed that during the established communication call with his friend, e.g. the second user U2, the first user U1 may decide to add video to the communication call (block 416). The terminal equipment part TE1 304 may thus generate and send the following command as a fourth AT command 418 to the mobile termination part MT1 302:

+CDU=2,"sip:bob@biloxy.com", "3gpp-service.ims.ic-si.mmtel", 1234, "voice,high-quality", "m=video 49170/2 RTP/AVP 31".

The fourth AT command 418 requests from the mobile termination part MT1 302 to modify the ongoing MMTel call identified by "1234". The modification adds video with properties indicated by the provided SDP media level section. Since SDP is being provided, the mobile termination part MT1 302 may be instructed not to encode and decode the video media data. Instead, the video RTP packets may be forwarded to the terminal equipment part TE1 304. The terminal equipment part TE1 304 itself may be taking care of encoding and decoding of the video media data.

Figure 5:
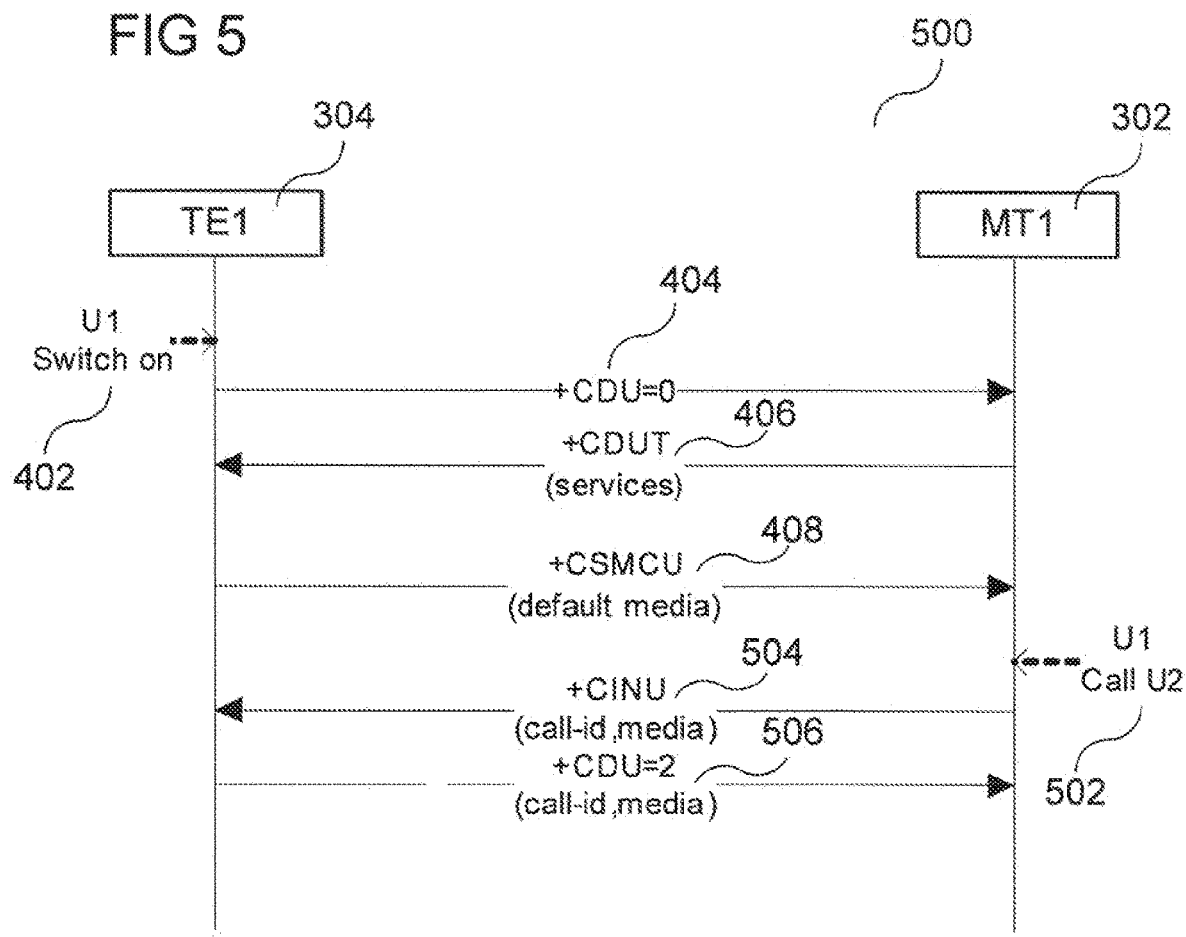
FIG. 5 shows a message flow diagram in accordance with various aspects of this disclosure.

FIG. 5 shows a message flow diagram 500 in accordance with various aspects of this disclosure. The message flow diagram 500 illustrates receiving an incoming MMTel call. For this example, the situation of the example as shown in FIG. 4 is assumed after the initialization of the first user U1's mobile phone T1 300.

Furthermore, it is assumed that the first user U1's friend, e.g. the second user U2 calls the first user U1 via the IMS multimedia communication service, e.g. MMTel (see block 502 in FIG. 5). The mobile termination part MT1 302 may receive a corresponding SIP INVITE request message from the second user U2's mobile phone T2. The SIP INVITE request message may include SDP for audio and video media data.

Then, the mobile termination part MT1 302 may generate and send the following AT command as a third AT command 504 to the terminal equipment part TE1 304:

+CINU="sip:bob@biloxy.com", "3gpp-service.ims.ic-si.mmtel", 5678, "voice,high-quality", "m=video 49170/2 RTP/AVP 31".

The third AT command 504 may inform the terminal equipment part TE1 304 that an MMTel communication call has been received from the indicated SIP address with high quality voice media data and with video media data. Since default media for MMTel communication services have been set to "voice,high-quality", the mobile termination part MT1 302 does not indicate SDP audio media data for encoding and decoding outside of the mobile termination part MT1 302, but high quality voice media data to be encoded and decoded by the mobile termination part MT1 302.

Furthermore, the terminal equipment part TE1 304 may indicate the incoming call to the first user U1. The first user U1 does not want to allow the second user U2 to see him via video media data. Therefore, the terminal equipment part TE1 304 may generate and send back the following AT command as a fourth AT command 506 to the mobile termination part MT1 302:

+CDU=2,"sip:bob@biloxy.com", "3gpp-service.ims.ic-si.mmtel", 5678, "voice,high-quality", "m=video 49170/2 RTP/AVP 31<CR><LF>a=recvonly".

The fourth AT command 506 may instructs the mobile termination part MT1 302 to accept the communication call but without sending video media data to the second user U2's mobile phone.

In the following, a general description of AT command extensions and AT commands introduced in accordance with various aspects of this disclosure will be provided.

A conventional AT command for dialing URIs has the following structure:

Dial URI +CDU

TABLE 1

| +CDU action command syntax | |
|---|---|
| Command | Possible response(s) |
| +CDU=<action>[,<URI>] | [+CDUT: <URI_scheme> [<CR><LF>+CDUT: <URI_scheme>][. . .]] |
| +CDU=? | |

Description: Execution command can be used to dial a URI or query the supported URI types.

Editor's note: It is FFS how the type of requested IMS service (e.g. voice or MMTel) and corresponding SDP are indicated.

Defined Values
<action>: Integer type
0 Query supported URI types. Execution command +CDU=0 returns a line of intermediate result +CDUT: <URI_scheme> for every supported <URI_scheme>.
1 Dial <URI>.
<URI>: string type URI including the prefix specifying the URI type; the URI may include URI parameters; the used character set should be the one selected with Select TE Character Set +CSCS.
<URI_scheme>: string type. Parameter identifies supported URI scheme.
"sip" Internet Assigned Number Authority (IANA) registry as per RFC 3969 [ccc], used with Session Initiation Protocol (SIP), see RFC 3261 [aaa].
"tel" Internet Assigned Number Authority (IANA) registry as per RFC 5341 [ddd], used with Session Initiation Protocol (SIP), see RFC 3966 [bbb].

Editor's note: The list of URI-schemes is not complete.

Extended AT command for dialing URIs according to various aspects of this disclosure:
+CDU=<action>[,<URI>[,<service>,<call-id>[,<media>][,<media>][ . . . ]]]
<service>: String type. Identifies an IMS service. If the parameter starts with "3gpp-service.ims.icsi." then the parameter is the ICSI value specified by 3GPP for an IMS service. If the parameter does not start with "3gpp-service.ims.icsi." then the parameter indicates a service for which 3GPP has not specified an ICSI value. For example, the VoLTE (Voice over Long Term Evolution) service might be indicated by the string "volte" and IMS messaging might be indicated by the string "messaging".
<call-id>: String type. Identifies an ongoing call. The call-id is to be ignored with the <action> value 1. The call-id is to be taken into account only with the <action> value 2 for modifying an ongoing call.
<media>: String type. Defines media. If the parameter starts with "m=" then the string is the media level section of an SDP description and the MT is requested to set up the call with media encoding and decoding to be done outside the MT. If the parameter does not start with "m=" then the string indicates the media type and possibly quality and the MT is requested to set up the call with media encoding and decoding to be done by the MT.

Extended AT command response to +CDU=0 according to various aspects of this disclosure:
[+CDUT:<URI_scheme>[,<service>][,<service>][ . . . ][<CR><LF>+CDUT: <URI_scheme>[,<service>][,<service>][ . . . ]][ . . . ]]
<service>: Specifies which services are supported by the MT for the URI scheme <URI_scheme>.

New AT command response to +CDU=1 according to various aspects of this disclosure:

+CDUC::<URI_scheme>,<service>,<call-id>[,<media>][,<media>][ ... ]

<call-id>: String type. Identifies the call having been set up by the MT. The call-id may be used for call identification when modifying the call later.

<media>: Specifies the media of the call having been set up.

New value for <action> for +CDU according to various aspects of this disclosure:

2: Modify an existing call. The call to be modified must be identified by the call-id received in the +CDUC response to the +CDU request for setting up the call.

New AT command for incoming call notification according to various aspects of this disclosure:

+CINU=<URI scheme>,<service>,<call-id>[,<media>][,<media>][ ... ]

<call-id>: Identifies the incoming call. The call-id may be used for call identification when modifying the call.

<media>: Specifies the media of the incoming call.

New AT command for configuring default media for a particular service according to various aspects of this disclosure:

+CSMCU=<service>[,<media>][,<media>][ ... ]

<service>: Service for which to configure media.

<media>: Specifies the default media for the service <service>. If no media are being specified by +CDU then the default media are to be used. The default media may also be used by the MT for incoming calls.

Some alternatives and/or extensions of the above described aspects will be described in the following.

Instead of ICSI values also other string type values like "messaging" might be used for service identification in AT commands (e.g. for the IMS messaging service).

When negotiating media with the network via SIP the MT may indicate so called IMS Application Reference Identifiers in accordance with the IMS service application on the MT.

If +CDU=1 is being used without indicating any service, then a default service may be initiated, e.g. a voice call may be set up. The default service may be specified by sending +CSMC with service indication but without media indication.

Call-ids may be based on the time when a call has been requested or received. For example call-ids may be chosen to be the time of call request or reception.

If call-ids are given by the time of call request or reception then call-ids may not be indicated to the TE in +CINU commands or +CDUC responses. In this case, TEs may determine relevant call-ids from the MTs internal clock (which can be queried by +CCLK commands according to the 3GPP technical specification TS 27.007, "AT command set for User Equipment (UE)", V11.1.0, 12/2011).

AT commands for phonebook dialing may be extended in a similar way as the direct dialing command +CDU as described above.

When requesting a call by sending a +CDU=1 command to the MT a call-id other than 0 may be specified. The specified call-id may be used as a proposed call-id for the requested call.

Other AT command names than the names used above may be used for the new AT commands introduced by the above described aspects.

Call-ids may not be unique over all calls processed by the MT, but instead may be only unique over all calls with the same URI and service parameters.

Call-ids may be unique over all calls processed by the MT. In this case, an ongoing call may be modified by a special AT command whereby the call may be identified solely by its call-id and not by its URI and service identifier.

Various aspects of the disclosure may enable control of a multitude of Internet Protocol Multimedia Subsystem (IMS) services provided by mobile terminations.

One or more of the following may be provided by various aspects of this disclosure:

It may be possible to specify the type of IMS service to be controlled.

It may be possible to specify media to be used by IMS services.

It may be possible to specify media quality for IMS services.

It may be possible to specify whether media encoding and decoding is to be done by one or more Mobile Terminations (MT) or by one or more Terminal Equipments (TE).

It may be possible to find out which IMS services are supported by MTs.

It may be possible to configure media support for incoming communication calls.

It may be possible to modify ongoing communication connections or communication calls.

It may be possible to control multiple instances of a particular IMS service.

It may be possible to control the media of an incoming communication call.

The syntax of control commands may be linear and simple.

Figure 6:
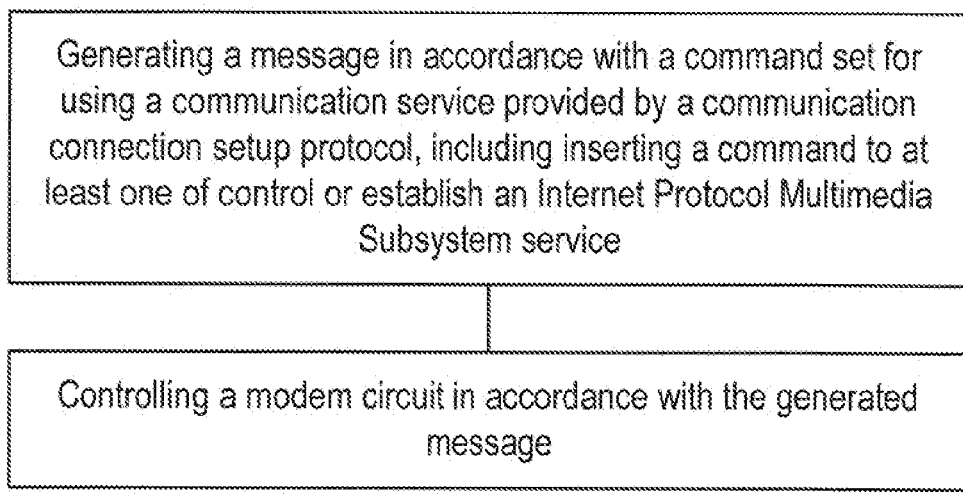
FIG. 6 shows a flow diagram illustrating a method for operating a communication device in accordance with various aspects of this disclosure.

FIG. 6 shows a flow diagram illustrating a method 600 for operating a communication device in accordance with various aspects of this disclosure. The method 600 may include, in 602, generating a message in accordance with a command set for using a communication service provided by a communication session setup protocol; and, in 604, controlling a modem circuit in accordance with the generated message; wherein the generating the message includes inserting a command to at least one of control or establish an Internet Protocol Multimedia Subsystem service.

The generating the message may include inserting an identifier to identify the Internet Protocol Multimedia Subsystem service or to identify an instance of the Internet Protocol Multimedia Subsystem service. Furthermore, the generating the message may include inserting information specifying whether media data is to be at least one of encoded and decoded by an application processor of the communication device. The generating the message may include inserting at least one of the following: information specifying a Uniform Resource Identifier; information specifying a modification of an established communication connection; information specifying a configuration of a communication service; or information controlling an incoming call. The generating the message may include inserting information specifying a Uniform Resource Identifier and at least one of a communication service parameter or a communication call identifier. The communication service parameter may include an Internet Protocol Multimedia Subsystem Communication Service Identifier (ICSI). The generating the message may include inserting a communication service parameter and a media data parameter to specify media data and media data properties for the Internet Protocol Multimedia Subsystem service. The media data parameter may include Session Description Protocol data. The generating the message may include generating the message in accordance with a modem command set. The generating the message may include generating the message in accordance with the AT command set. Moreover, the method may further include providing the communication service by the communication session setup protocol, e.g. the Session Initiation Protocol.

Figure 7:
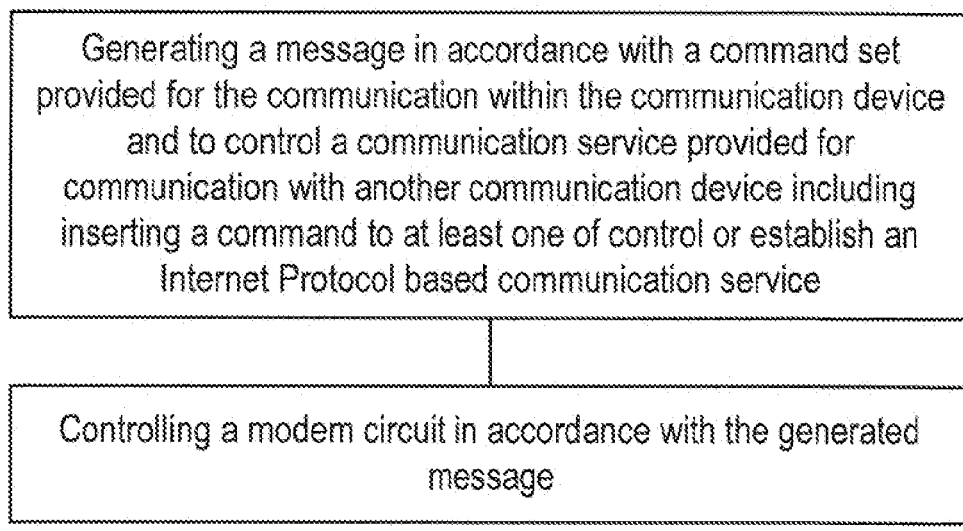
FIG. 7 shows a flow diagram illustrating a method for operating a communication device in accordance with various aspects of this disclosure.

FIG. 7 shows a flow diagram illustrating a method 700 for operating a communication device in accordance with various aspects of this disclosure. The method 700 may include, in 702, generating a message in accordance with a command set provided for the communication within the communication device and to control a communication service provided for communication with another communication device, and, in 704, controlling a modem circuit of the communication device in accordance with the generated message, wherein the generating the message comprises inserting a command to at least one of control or establish an Internet Protocol based communication service.

The generating the message may include inserting a command to at least one of control or establish an Internet Protocol based multimedia communication service. The generating the message may include inserting an identifier to identify the Internet Protocol based communication service or to identify an instance of the Internet Protocol based communication service. The generating the message may include inserting an information specifying whether media data is to be at least one of encoded or decoded by an application processor of the communication device. The generating the message may include inserting at least one of the following: information specifying a Uniform Resource Identifier; information specifying a modification of an established communication connection; information specifying a configuration of a communication service; or information controlling an incoming call. The generating the message may include inserting an information specifying a Uniform Resource Identifier and at least one of a communication service parameter or a communication call identifier. The communication service parameter may include an Internet Protocol Multimedia Subsystem Communication Service Identifier (ICSI). The generating the message may include inserting a communication service parameter and a media data parameter to specify media data and media data properties for the Internet Protocol based communication service. The media data parameter may include Session Description Protocol data. The generating the message may include generating the message in accordance with a modem command set. The generating the message may include generating the message in accordance with the AT command set. The method may further include providing the communication service including by the communication session setup protocol, e.g. the Session Initiation Protocol.

While the invention has been particularly shown and described with reference to specific embodiments, it should be understood by those skilled in the art that various changes in form and detail may be made therein without departing from the spirit and scope of the invention as defined by the appended claims. The scope of the invention is thus indicated by the appended claims and all changes which come within the meaning and range of equivalency of the claims are therefore intended to be embraced.

What is claimed is:

1. A device in a wireless communications system, the device comprising:
a Mobile Termination circuit (MT) to provide modem functionality for communications with other devices; and
a Terminal Equipment circuit (TE) to provide application and user interface functionality, the TE connected to the MT using a Terminal Adaptor (TA) that provides an interface for exchange of attention (AT) commands and AT command responses between the TE and the MT, wherein the TE is configured to perform operations comprising:
receiving, from the MT, a first AT command for an incoming multimedia call from a second device acting as an endpoint for the multimedia call to be established with the TE, the first AT command specifying a plurality of types of media proposed to be used for the incoming multimedia call; and
in response to receiving the first AT command, sending a second AT command to the MT to accept the incoming multimedia call, the second AT command including instructions to (i) reject at least one type of media of the plurality of types of media and (ii) accept at least one other type of media of the plurality of types of media specified by the first AT command to be used for the incoming multimedia call.

2. The device of claim 1, wherein the second AT command causes the MT to trigger a Session Initiation Protocol (SIP) media negotiation with the second device to accept, reject, or modify the one or more types of media to be used for the incoming multimedia call.

3. The device of claim 1, wherein the TE is configured to perform operations further comprising:
sending an initial AT command to the MT, the initial AT command requesting information about supported uniform resource identifier (URI) types supported by the MT; and
receiving an AT command response from the MT in response to the initial AT command, the AT command response including a list of URI types supported by the MT.

4. The device of claim 3, wherein the AT command response includes a parameter for each supported URI type.

5. The device of claim 3, wherein the TE is configured to perform operations further comprising:
upon receiving the AT command response from the MT, sending a third AT command to the MT, the third AT command indicating (i) a default media type to be used for communication sessions, and (ii) whether the default media type is to be encoded and decoded outside of the MT or inside of the MT.

6. The device of claim 5, wherein the TE is configured to perform operations comprising:
encoding and decoding media obtained during a communication session when the media is of the default media type and when the second third AT command indicates that the default media type is to be encoded and decoded outside of the MT.

7. The device of claim 5, wherein the MT is configured to perform operations comprising:
encoding and decoding media obtained during a communication session when the media is of the default media type and when the third AT command indicates that the default media type is to be encoded and decoded inside of the MT.

8. The device of claim 1, wherein the device includes a mobile radio communication device,
wherein the incoming multimedia call is one of a voice call, or a video call, and
wherein the one or more types of media include at least one of a voice media type or a video media type.

9. A method comprising:

receiving, by a Terminal Equipment circuit (TE) of a network device from a Mobile Termination circuit (MT) of the network device, a first attention (AT) command for an incoming multimedia call from a second device acting as an endpoint for the multimedia call to be established with the TE, the first AT command specifying a plurality of types of media proposed to be used for the incoming multimedia call, wherein the TE provides application and user interface functionality to the network device and the MT provides modem functionality for communications with other devices including the second device in a wireless communications system, and wherein the TE is connected to the MT using a Terminal Adaptor (TA) of the network device that provides an interface for exchange of AT commands and AT command responses between the TE and the MT; and in response to receiving the first AT command, sending, by the TE, a second AT command to the MT to accept the incoming multimedia call, the second AT command including instructions to (i) reject at least one type of media of the plurality of types of media and (ii) accept at least one other type of media of the plurality of types of media specified by the first AT command to be used for the incoming multimedia call.

10. The method of claim 9, wherein the second AT command causes the MT to trigger a Session Initiation Protocol (SIP) media negotiation with the second device to accept, reject, or modify the one or more types of media to be used for the incoming multimedia call.

11. The method of claim 9, further comprising:

sending, by the TE, an initial AT command to the MT, the initial AT command requesting information about supported uniform resource identifier (URI) types supported by the MT; and receiving, by the TE, an AT command response from the MT in response to the initial AT command, the AT command response including a list of URI types supported by the MT.

12. The method of claim 11, wherein the AT command response includes a parameter for each supported URI type.

13. The method of claim 11, further comprising:

upon receiving the AT command response from the MT, sending, by the TE, a third AT command to the MT, the third AT command indicating (i) a default media type to be used for communication sessions, and (ii) whether the default media type is to be encoded and decoded outside of the MT or inside of the MT.

14. The method of claim 13, further comprising:

encoding and decoding, by the TE, media obtained during a communication session when the media is of the default media type and when the third AT command indicates that the default media type is to be encoded and decoded outside of the MT.

15. The method of claim 13, further comprising:

encoding and decoding, by the MT, media obtained during a communication session when the media is of the default media type and when the third AT command indicates that the default media type is to be encoded and decoded inside of the MT.

16. The method of claim 9, wherein the network device includes a mobile radio communication device, wherein the incoming multimedia call is one of a voice call, or a video call, and wherein the one or more types of media include at least one of a voice media type or a video media type.

* * * * *